(12) United States Patent
Yang et al.

(10) Patent No.: US 8,549,358 B2
(45) Date of Patent: Oct. 1, 2013

(54) METHOD AND APPARATUS FOR SESSION ESTABLISHMENT MANAGEMENT

(75) Inventors: Chen-Yui Yang, Marlboro, NJ (US);
Paritosh Bajpay, Edison, NJ (US);
David H. Lu, Morganville, NJ (US);
Anthony Mark Srdar, Alpharetta, GA (US); Fang Wu, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 338 days.

(21) Appl. No.: 12/957,723

(22) Filed: Dec. 1, 2010

(65) Prior Publication Data
US 2012/0144226 A1 Jun. 7, 2012

(51) Int. Cl.
*G06F 11/00* (2006.01)

(52) U.S. Cl.
USPC .......................................................... 714/37

(58) Field of Classification Search
USPC ................................................. 714/4.1, 2, 37
See application file for complete search history.

(56) References Cited

U.S. PATENT DOCUMENTS

2006/0253745 A1* 11/2006 Maso et al. ...................... 714/47
2009/0111382 A1* 4/2009 Yao .............................. 455/67.7
2009/0287811 A1* 11/2009 Juhasz et al. ................... 709/224

* cited by examiner

*Primary Examiner* — Yair Leibovich

(57) ABSTRACT

A method, computer readable medium and apparatus for performing session establishment management. For example, the method detects an evolved packet system establishment success rate that is measured over a predefined period of time falling below a predefined threshold, and performs, via a rule management server, an analysis on a bearer portion. The method then associates, via the rule management server, a root cause that contributed to the evolved packet system establishment success rate falling below the predefined threshold.

11 Claims, 10 Drawing Sheets

METHOD AND APPARATUS FOR SESSION ESTABLISHMENT MANAGEMENT

BACKGROUND

The third generation partnership project (3GPP) long term evolution (LTE) represents a major advance in cellular technology. LTE is designed to meet carrier needs for high-speed data and media transport as well as high-capacity voice support well into the next decade. LTE is well positioned to meet the requirements of next-generation mobile networks. It will enable operators to offer high performance, mass-market mobile broadband services, through a combination of high bit-rates and system throughput (in both the uplink and downlink) with low latency.

However, service outages in the LTE network are particularly difficult to detect and require considerable manual effort for compensation. Temporary outages are difficult to resolve within a short time frame potentially causing the affected area to be out of service coverage.

SUMMARY

In one embodiment, the present disclosure teaches a method, computer readable medium and apparatus for performing session establishment management. In one embodiment, the method comprises detecting an evolved packet system establishment success rate that is measured over a predefined period of time falling below a predefined threshold, performing, via a rule management server, an analysis on a bearer portion in response to the detecting, and associating, via the rule management server, a root cause that contributed to the evolved packet system establishment success rate falling below the predefined threshold.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
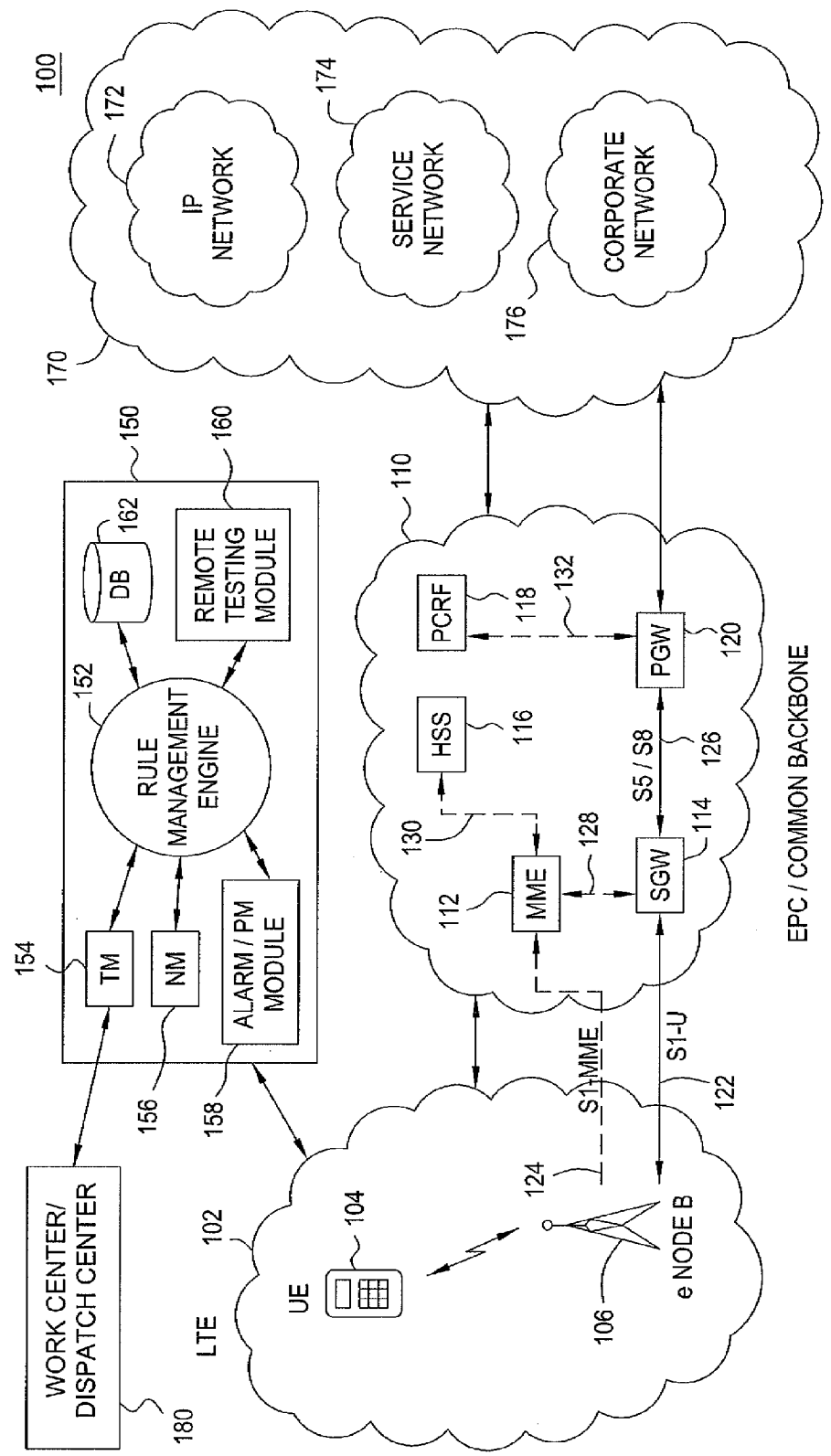
FIG. 1 illustrates one example of a long term evolution evolved packet system network architecture.

The present disclosure broadly discloses a method, a non-transitory computer readable medium and an apparatus for performing establishment management in a long term evolution evolved packet system network architecture. FIG. 1 is a block diagram depicting one example of a long term evolution (LTE) evolved packet system (EPS) network architecture 100 related to the current disclosure. In one embodiment, the LTE EPS network architecture 100 includes an LTE network 102, an evolved packet core (EPC) or common backbone (CBB) 110, a rule management system 150 and peer entities 170.

Broadly, the LTE network 102 includes user equipment (UE) 104 and a base station 106. In one embodiment, the base station 106 may be an eNodeB. The UE 104 may communicate with the base station 106 over the air and wirelessly.

In one embodiment, the EPC/CBB 110 includes a mobile management entity (MME) 112, a serving gateway (SGW) 114, a home subscriber server (HSS) 116, a policy and charging rules function (PCRF) 118 and a packet data network (PDN) gateway (PGW) 120. In one embodiment, the MME 112 performs all of the control signaling between various equipment and devices in the LTE network 102 and the EPC/CBB 110.

The SGW 114 routes and forwards user data packets. When the UE 104 is idle, the SGW 114 terminates the downlink data path and triggers paging when data arrives for the UE 104.

The HSS 116 manages subscription-related information for a user of the UE 104. For example, the HSS 116 may store information such as authorization of the user, security requirements for the user, quality of service (QoS) requirements for the user, etc. For example, the MME 112 may communicate with the HSS 116 to determine if the UE 104 is even authorized to establish a call before the call is established.

The PCRF 118 performs QoS management functions and policy control. The PGW 120 provides connectivity from the UE 104 to the peer entities 170.

Within the LTE network 102 and the EPC/CBB 110 there may be various bearer paths/interfaces represented by solid lines 122 and 126. Some of the bearer paths may be referred to by a specific label. For example, line 122 may be considered an S1-U bearer and line 126 may be considered an S5/S8 bearer. In addition, the EPC/CBB 110 may include various signaling bearer paths/interfaces represented by dashed lines 124, 128, 130 and 132. Some of the signaling bearer paths may be referred to by a specific label. For example, line 124 may be considered an S1-MME signaling bearer, line 128 may be considered an S11 signaling bearer and line 130 may be considered an S6a signaling bearer. The above bearer paths and signaling bearer paths are only illustrated as examples and it should be noted that additional bearer paths and signaling bearer paths may exist that are not illustrated. For example, Table 1 describes other possible interfaces and a description of each of the possible interfaces.

TABLE 1

INTERFACES

| Interface | Description |
| --- | --- |
| S1-MME | Reference point for the control plane protocol between E-UTRAN and MME. |
| S1-U | Reference point between E-UTRAN and Serving GW for the per bearer user plane tunneling and inter eNodeB path switching during handover. |
| S3 | Reference point between E-UTRAN and Serving GW for the per bearer user plane tunneling and inter eNodeB path switching during handover. |
| S4 | It provides related control and mobility support between GPRS Core and the 3GPP Anchor function of Serving GW. In addition, if Direct Tunnel is not established, it provides the user plane tunneling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S6a | It enables transfer of subscription and authentication data for authenticating/authorizing user access to the evolved system (AAA interface) between MME and HSS. |
| Gx | It provides transfer of (QoS) policy and charging rules from PCRF to Policy and Charging Enforcement Function (PCEF) in the PDN GW. |
| S8 | Inter-PLMN reference point providing user and control plane between the Serving GW in the VPLMN and the PDN GW in the HPLMN. S8 is the inter PLMN variant of S5. |
| S9 | It provides transfer of (QoS) policy and charging control information between the Home PCRF and the Visited PCRF in order to support local breakout function. |
| S10 | Reference point between MMEs for MME relocation and MME to MME information transfer. |
| S11 | Reference point between MME and Serving GW. |
| S12 | Reference point between UTRAN and Serving GW for user plane tunnelling when Direct Tunnel is established. It is based on the Iu-u/Gn-u reference point using the GTP-U protocol as defined between SGSN and UTRAN or respectively between SGSN and GGSN. Usage of S12 is an operator configuration option. |
| S13 | It enables UE identity check procedure between MME and EIR. |
| SGi | It is the reference point between the PDN GW and the packet data network. Packet data network may be an operator external public or private packet data network or an intra operator packet data network, e.g., for provision of IMS services. This reference point corresponds to Gi for 3GPP accesses. |
| Rx | The Rx reference point resides between the AF and the PCRF in the TS 23.203 [6]. |
| SBc | Reference point between CBC and MME for warning message delivery and control functions. |

It should be noted that the LTE network 102 and the EPC/CBB 110 are illustrated in a simplified block diagram in FIG. 1. In other words, the LTE network 102 and the EPC/CBB 110 may include additional network elements that are not shown such as various routers, switches and controllers. In addition, although FIG. 1 illustrates only a single one of each of the various network elements, it should be noted that the LTE network 102 and the EPC/CBB 110 may include any number of the various network elements. For example, the EPC/CBB 110 may include a pool (i.e., more than one) of MMEs 112, SGWs 114 or PGWs 120.

The peer entities 170 may include external networks. For example, the peer entities may include trusted and non-trusted external networks such as an internet protocol (IP) network 172, a service network 174, a corporate network 176 and the like.

The LTE EPS network architecture 100 also includes a rule management system 150. In one embodiment, the rule management system 150 can be implemented as one or more independent servers or included as part of another application server within the LTE EPS network architecture 100. In one embodiment, the rule management system 150 may be located in the EPC/CBB 110 or external to the EPC/CBB 110. The rule management system 150 is in communication with various devices within the LTE network 102 and the EPC/CBB 110.

In one embodiment, the rule management system 150 includes a rule management engine 152, a ticketing module (TM) 154, a notification module (NM) 156, an alarm and preventative maintenance (PM) module 158, a remote test module 160 and a network inventory database (DB) 162. The ticketing module 154 and the notification module 156 may communicate with a work center or dispatch center 180. The alarm and PM module 158 and the remote testing module 160 are used to track failures, initiate the performance of various tasks and initiate various verification processes, as discussed in further detail below. The network inventory database (DB) 162 may include an updated view of all equipment or network elements within the LTE EPS network architecture 100.

The rule management engine 152 is used to analyze collected data to determine whether establishment requests in the LTE EPS network architecture 100 are failing. The rule management engine 152 is programmed with various functions, rules and/or equations for calculating or determining whether various establishment success rates (ESRs) are being met within various portions of the LTE network 102 and the EPC/CBB 110, as discussed in further detail below. Based upon these calculations or determinations, the rule management engine 152 may direct the ticketing module 154 or the notification module 158 to contact the work center or dispatch center 180. Alternatively, based upon these calculations or determinations, the rule management engine 152 may direct the alarm/PM module 158 or the remote testing module 160 to initiate the performance of various tasks or initiate various verification processes.

Figure 10:
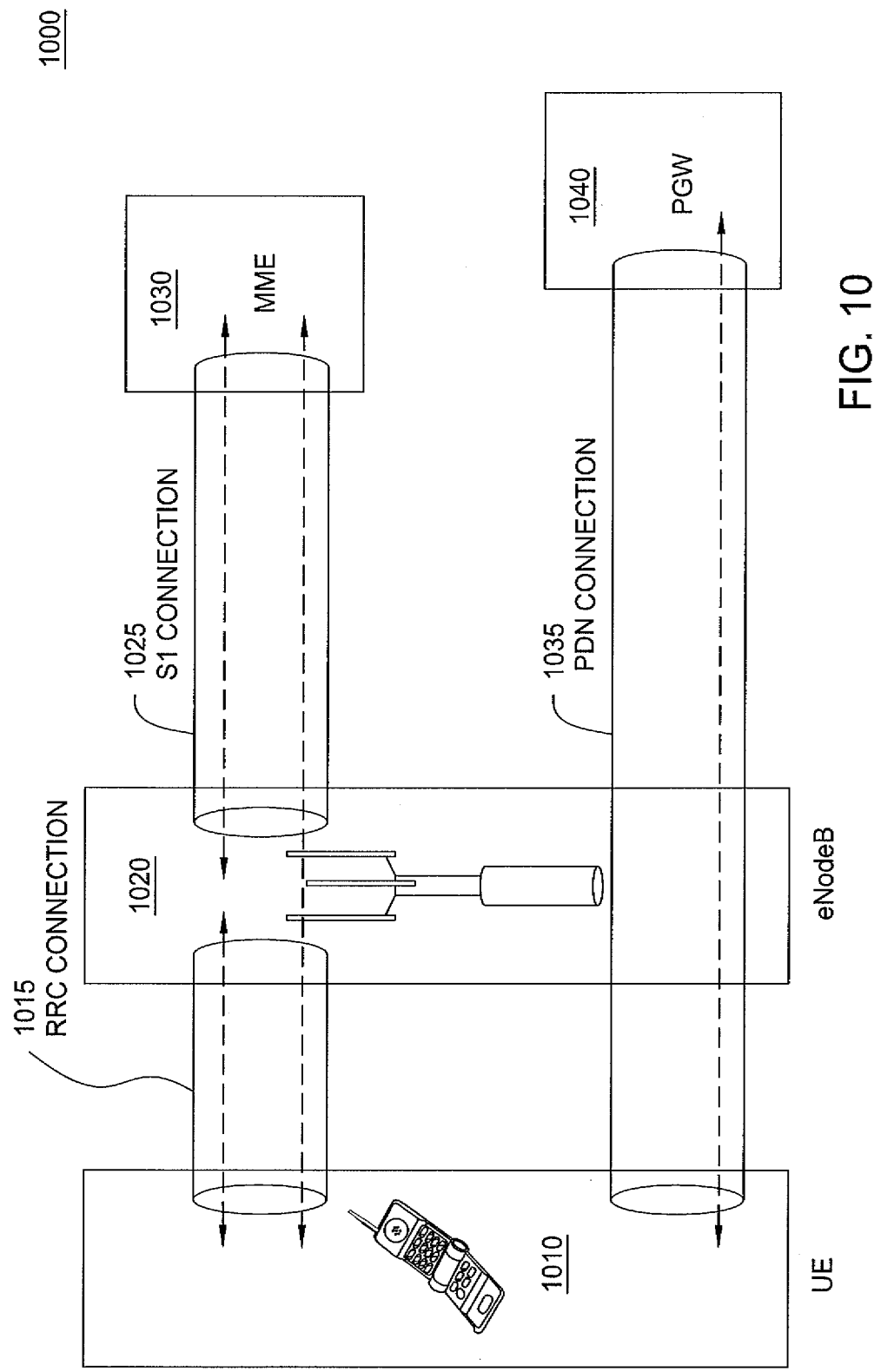
FIG. 10 illustrates a portion of the long term evolution evolved packet system network architecture with greater details.

FIG. 10 illustrates a portion 1000 of the long term evolution evolved packet system network architecture 100 with greater details. This Figure provides the sequence of EPS bearer connection establishment. For example, FIG. 10 illustrates an RRC connection 1015 (broadly a first connection) being first established between the user endpoint 1010 and an eNodeB 1020. In one embodiment, RRC messages are used to convey the necessary signaling to establish, maintain and release radio resources for signaling and radio bearers as further described below. FIG. 10 also illustrates an S1 connection 1025 (broadly a second connection) being established next between the eNodeB 1020 and an MME 1030. In one embodiment, S1 messages are used to convey the necessary signaling to establish, maintain and release S1 user bearers. Furthermore, it should be noted that NAS signaling can be used to allow the user endpoint to establish, maintain and release EPS bearers of the user endpoint, to implement mobility management procedures and to implement user endpoint session management and the like. Finally, FIG. 10 also illustrates a Packet Data Network (PDN) connection 1035 (broadly a third connection) being established next between the user endpoint 1010 and a PGW 1040. In one embodiment, S11 and S1U messages are used in the selection of the SGW and PGW, and the like. Further discussions of these connections are provided below.

Figure 2:
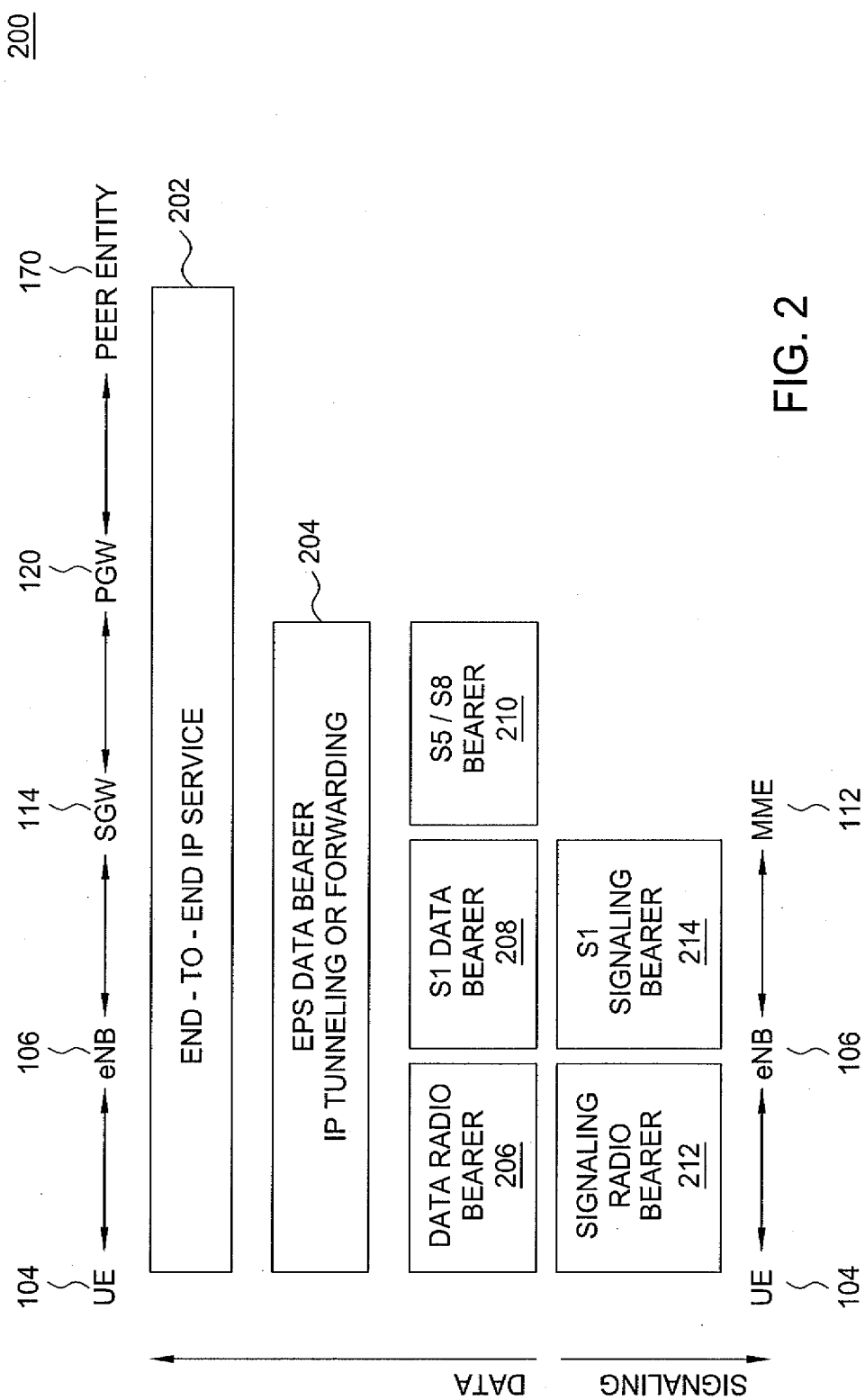
FIG. 2 illustrates a block diagram of an evolved packet system bearer architecture.

FIG. 2 illustrates a block diagram of an evolved packet system bearer architecture. For example, data that traverses the UE 104, the base station (e.g., eNodeB) 106, the SGW 114, the PGW 120 and the peer entity 170 may be considered to constitute an end-to-end IP service 202. However, for the present disclosure, to properly perform establishment management in the LTE EPS network architecture 100, only the EPS data bearer portion 204 of the end-to-end IP service 202 is analyzed.

An establishment may be defined herein as a connection set up request between any two elements within the LTE EPS network architecture 100. The connection set up request may be for data or for signaling. A failed establishment may be defined as a connection set up request that was unsuccessful. A successful establishment may be defined as a connection set up request that was successful.

In one embodiment, the EPS data bearer portion 204 comprises a first portion 206 (e.g., a data radio bearer 206), a second portion 208 (e.g., an S1 data bearer 208) and a third portion 210 (e.g., an S5/S8 bearer 210). Various signaling bearer portions are also illustrated in FIG. 2 between the UE 104 and the MME 112. For example, a first signaling portion 212 (e.g., a signaling radio bearer 212) and a second signaling portion 214 (e.g., an S1 signaling bearer 214).

In one embodiment, an overall EPS ESR is calculated for the EPS data bearer portion 204. The EPS ESR is calculated by Equation 1:

EPS ESR=signaling radio bearer ESR×S1 signaling bearer ESR×PDN bearer ESR    (Eq. 1)

In one embodiment, the PDN bearer ESR comprises a combination of the ESRs as illustrated by Equation 2:

PDN bearer ESR=Selection of SGW and PDN-GW ESR×S11 Interface Establish ESR×S5/S8 Bearer ESR×S1AP(S1 Application Protocol) Interface Establish ESR    (Eq. 2)

The ESR for each of the portions of the EPS data bearer portion 204 is calculated as described by example Equations 3-5:

signaling radio bearer ESR=1−($\Sigma$RAB$_{failed}$/ $\Sigma$RAB$_{requested}$)×100,    (Eq. 3)

where $\Sigma$RAB$_{failed}$ represents a total number of failed establishment requests in the signaling radio bearer 212 portion (e.g., Radio Resource Control (RRC) connection request–RRC connection setup complete) and $\Sigma$RAB$_{requested}$ represents a total number of RRC connection requests in the signaling radio bearer 212 portion.

FIGS. 6-9 provide various illustrative connection establishment procedures. It should be noted that these connection establishment procedures are only provided as examples and should not be interpreted as limitations to the present disclosures. In other words, other connection establishment procedures are within the scope of the present disclosure. Namely, the present disclosure is not limited to the specific sequence of steps or the specific information passed between the various network entities during the connection establishment procedures.

Figure 6:
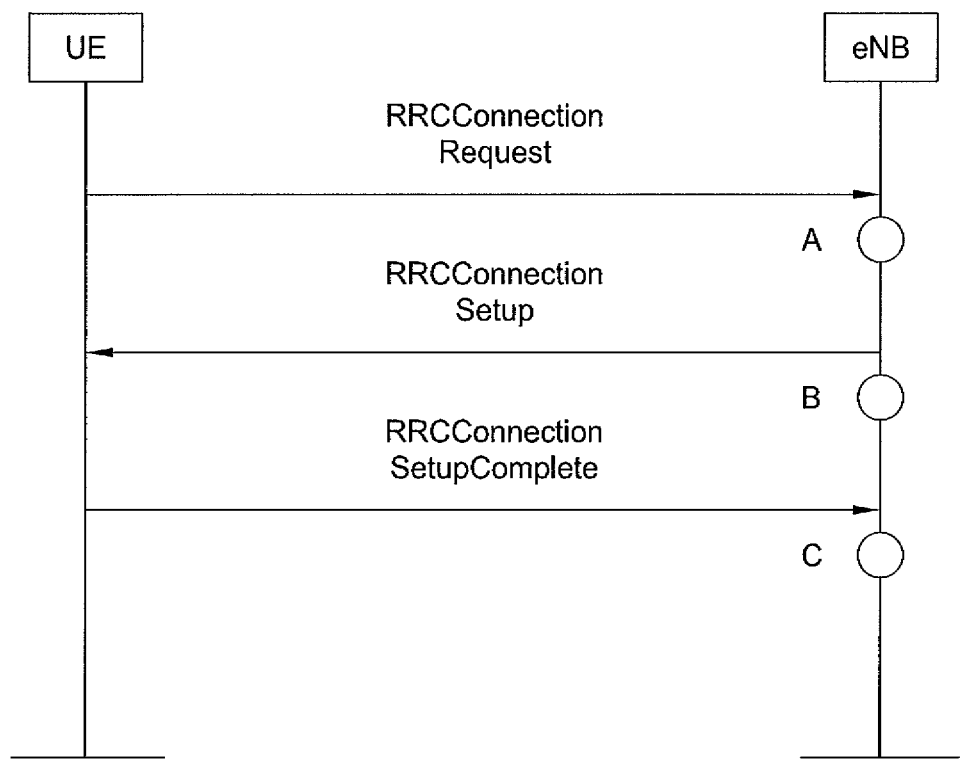
FIG. 6 illustrates one example of a radio bearer connection establishment procedure.

FIG. 6 illustrates one example of the signaling bearer connection establishment procedure. The RRC Setup Success Rate (Signaling) is usually calculated based on the counters measured at the eNodeB (both the RRC connection setup attempts and the successful RRC connection setup counters). This metric is critical as RRC Connection Setup is the very "first" step of the UE accessing the network and associated with service accessibility. For any speech or data call, a UE first makes a RRC request. After the RRC connection is successful, the UE then makes an EPS(RAB) establishment. A call is successful only when RRC and EPS attempts are successful.

As illustrated by FIG. 6, RRC Connection Establishment is triggered by the UE during a Random Access procedure. In one embodiment, Signaling Radio Bearers (SRBs) are defined as Radio Bearers (RB) that are used only for the transmission of RRC and Non Access Stratum (NAS) messages. More specifically, the following three SRBs are defined: SRB0 is for RRC messages using the CCCH logical channel, SRB1 is for NAS messages and for most RRC messages, all using DCCH logical channel, and SRB2 is for high-priority RRC messages, using DCCH logical channel. Following a successful Random Access, the UE sends a message RRC CONNECTION REQUEST on the Common Control Channel (CCCH). The Radio Base Station (RBS), e.g., e Node B (eNB), allocates the resources necessary for SRB1 and responds to the UE with message RRC CONNECTION SETUP on the CCCH. RRC CONNECTION SETUP includes information on the configuration to use. The UE applies the received configuration and responds with RRC CONNECTION SETUP COMPLETE, sent on the Dedicated Control Channel (DCCH). Included in this message is information required by the RBS to select the MME to which it connects.

The S1 signaling bearer ESR is calculated as follows:

S1 signaling bearer ESR=Registration ESR×AKA ESR    (Eq. 4)

where Registration ESR=1−($\Sigma$REG$_{failed}$/$\Sigma$REG$_{requested}$)×100, where REG$_{requested}$=Non Access Stratum (NAS) EPS Mobility Management (ESM) Attach Request and REG$_{failed}$=NAS ESM Attach Response Fail, and AKA ESR=1−($\Sigma$AKA$_{failed}$/$\Sigma$AKA$_{requested}$)×100, where AKA Requested=S6a Update Location Request, and AKA Failed=S6a Update Location Answer Fail.

Figure 7:
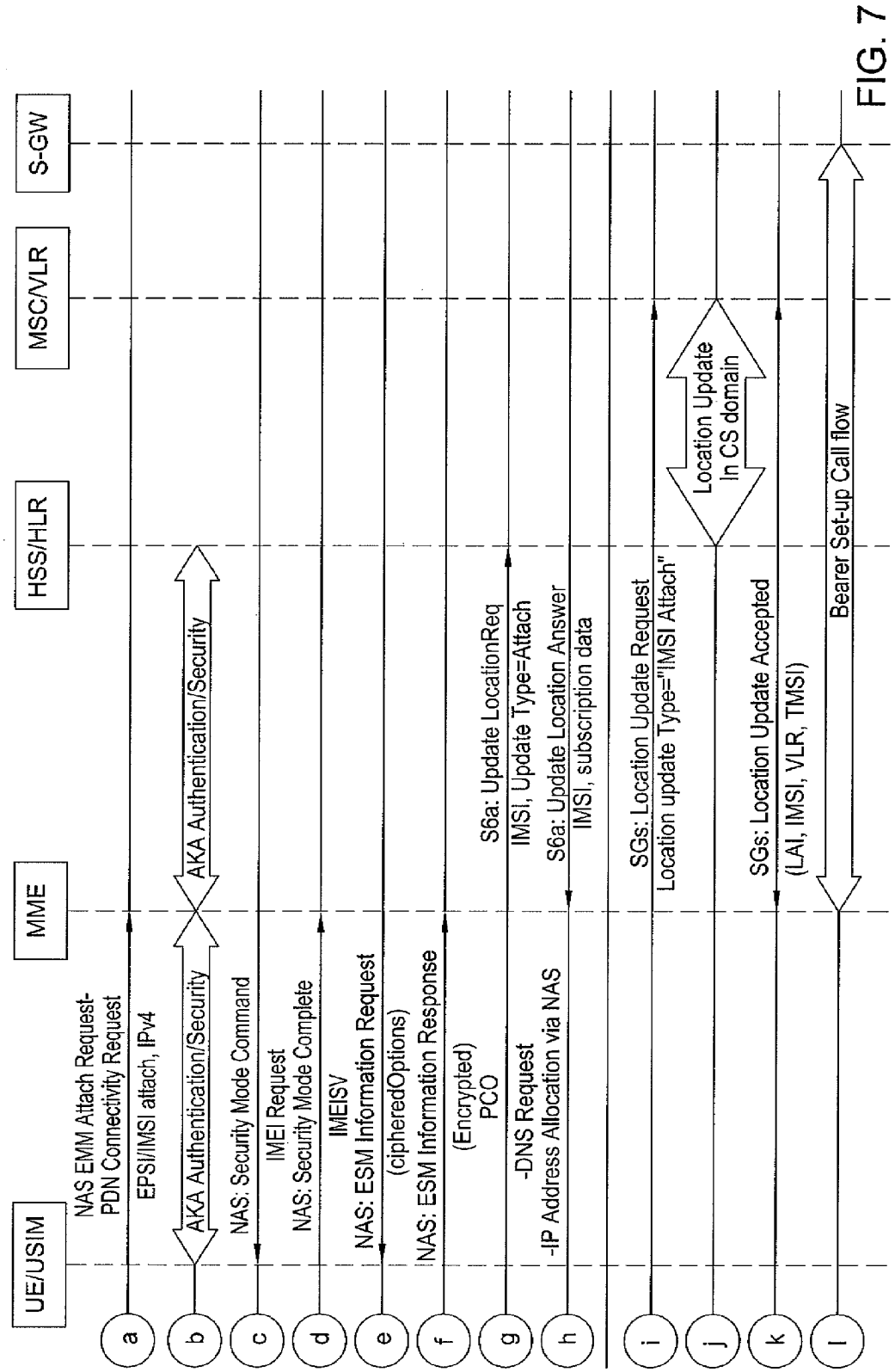
FIG. 7 illustrates one example of an S1 signaling bearer connection establishment procedure.

FIG. 7 illustrates one example of the S1 signaling bearer establishment procedure. The key steps are (1) Registration over the LTE NAS protocol (or called NAS (Non Access Stratum) EMM (EPS Mobility Management) Attach Establish) (shown as steps a-f) and (2) Authentication over the LTE S6a interface (or called Authentication and Key Agreement (AKA)) (shown as steps g-k). As illustrated in FIG. 7, NAS (Non Access Stratum) EMM (EPS Mobility Management) Attach Establish steps are shown. The UE sends a request (e.g., step a) to the network to attach, which includes a NAS EMM Attach Request.

It should be noted that the MME is the control node (CN) which processes the signaling from the UE. The protocols running between the UE and the CN are known as the Non-Access Stratum (NAS) protocols. In addition, two levels of NAS states reflect the state of a UE in respect of the connection establishment: the EPS Mobility Management (EMM) state (EMM-DEREGISTERED or EMMREGISTERED) reflects whether the UE is registered in the MME, and the EPS Connection Management (ECM) state (ECM-IDLE or ECM-CONNECTED) reflects the connectivity of the UE with the Evolved Packet Core.

In turn, an AKA Authentication process will be triggered (e.g., steps b-f). For example, if the MME has no record of a session for this UE, then it will trigger the AKA authentication process. The authentication parameters will be retrieved from the HSS/Home Location Register (HLR), the UE will receive an authentication challenge and upon successful completion, the MME will send security parameters to the eNodeB.

In turn, a S6a Update Location Request (e.g., step g) includes sending an Update Location Request (e.g., MME Identity, IMSI, ME Identity, MME Capabilities, Update Type) message to the HSS/HLR. The MME capabilities indicate the MME's support for regional access restrictions functionality. Update Type indicates this is an Attach procedure. An S6a Update Location Answer (e.g., step h) includes the HSS acknowledging the Update Location message by indicating success in an Update Location Answer (IMSI, Subscription data) message to the MME. The Subscription Data contains one or more PDN subscription contexts.

Steps i-l represent the SGWs establishment procedures and are independent procedures. The procedures can be performed concurrently or sequentially depending on the implementation.

Each portion of the PDN bearer ESR is calculated as follows:

$$\text{Selection of SGW and PDN-GW ESR} = 1 - (\Sigma SEL_{failed} / \Sigma SEL_{requested}) \times 100 \quad \text{(Eq. 5)}$$

where $\Sigma SEL_{failed}$ represents DNS response failure and $\Sigma SEL_{requested}$ represents DNS Query.

$$\text{S11 Interface Establish ESR} = 1 - (\Sigma S11_{failed} / \Sigma S11_{requested}) \times 100 \quad \text{(Eq. 6)}$$

where $\Sigma S11_{failed}$ represents S11 create session response failure and $\Sigma S11_{requested}$ represents S11 create session request.

$$\text{S5/S8 Bearer ESR} = 1 - (\Sigma S5/S8_{failed} / \Sigma S5/S8_{requested}) \times 100 \quad \text{(Eq. 7)}$$

where $\Sigma S5/S8_{failed}$ represents S5 create session response failure and $\Sigma S5/S8_{requested}$ represents S5 create session request.

$$\text{S1AP Interface Establish ESR} = 1 - (\Sigma S1AP_{failed} / \Sigma S1AP_{requested}) \times 100 \quad \text{(Eq. 8)}$$

where $\Sigma S1AP_{failed}$ represents S1AP Initial Context Set-up Response Failure and $\Sigma S1AP_{requested}$ represents S1AP Initial Context Set-Up Request.

Figure 8:
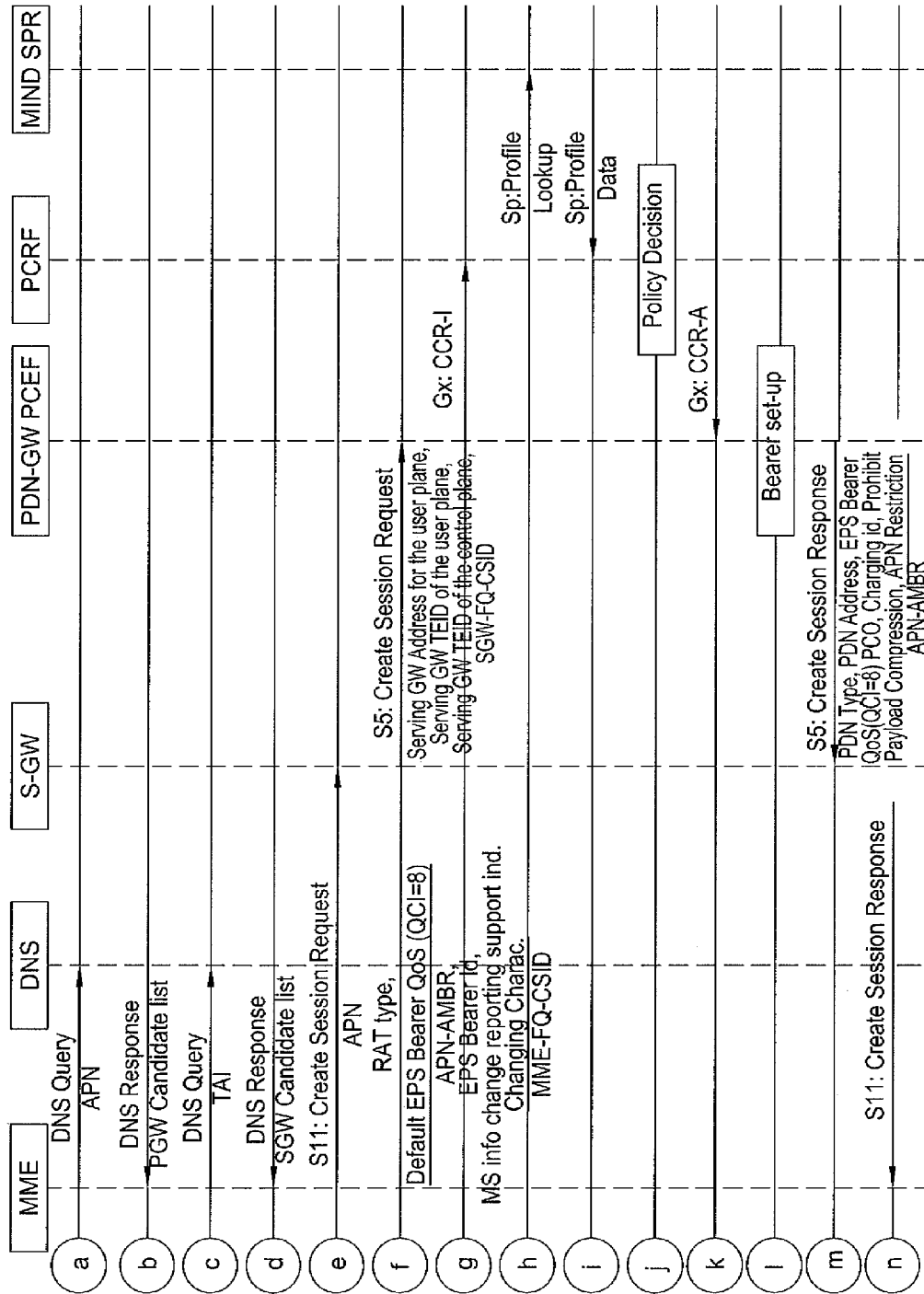
FIG. 8 illustrates one example of a selection of a SGW and PDN-GW and S11 interface establishment procedure used for a PDN bearer establishment rate.
Figure 9:
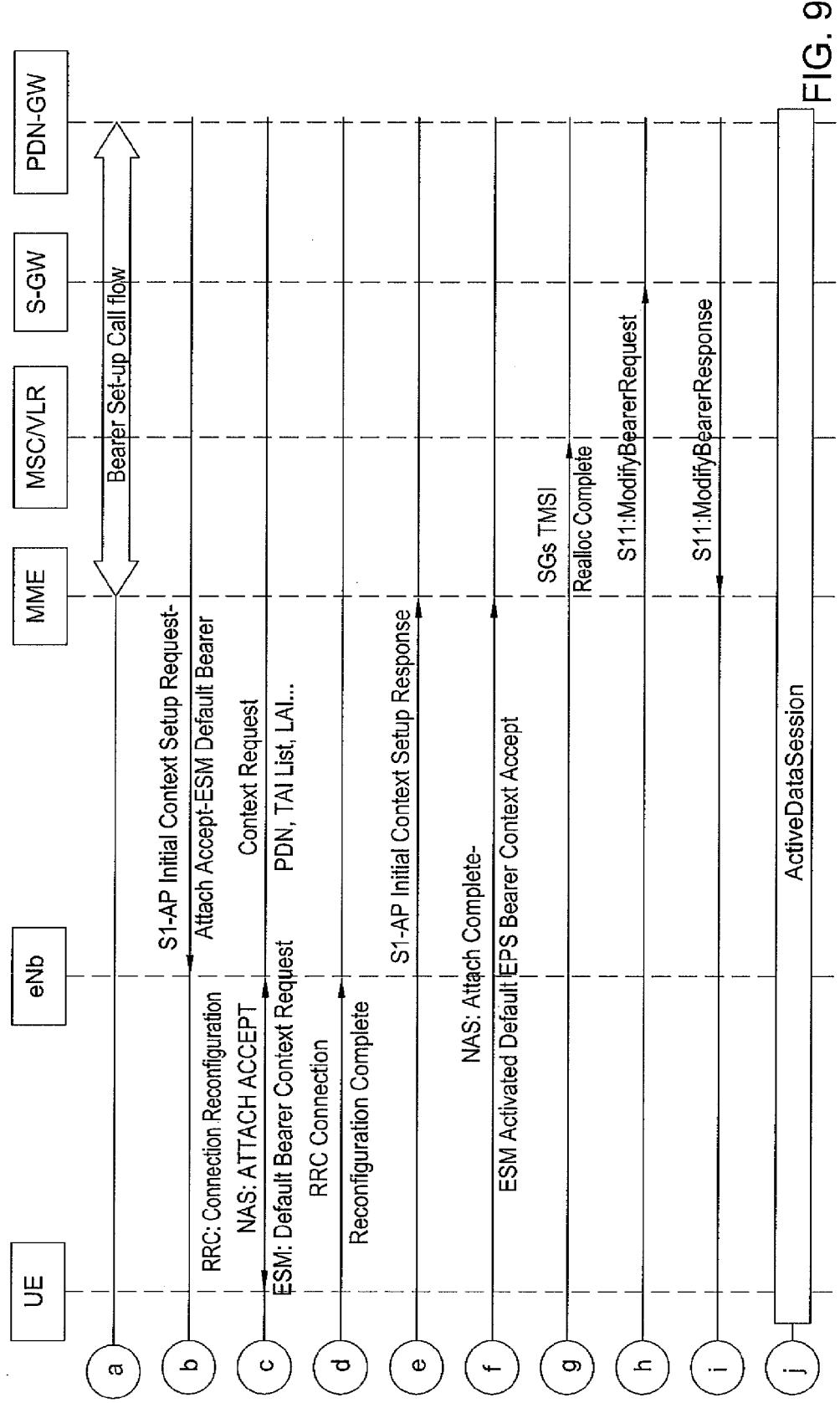
FIG. 9 illustrates one example of an S1 application protocol interface establishment procedure used for the PDN bearer establishment rate.

FIGS. 8 and 9 illustrate one example of the PDN bearer connection establishment procedure. FIG. 8 illustrates one example of the selection of a SGW and PDN-GW and S11 interface establishment procedure and FIG. 9 illustrates one example of the S1 application protocol interface establishment procedure. The key steps for PDN bearer connection are (1) Successful selection of a SGW and PDN-GW via a domain name server (DNS) look up (steps a-d of FIG. 8) (2) Successful connection establishment between MME and S-GW over the S11 interface (steps e and n of FIG. 8), (3) Successful connection establishment between S-GW and PDN-GW over the S5/S8 interface (steps f-m of FIGS. 8), and (4) Successful connection establishment between eNB and S-GW over the S1AP (S1 Application Protocol) interface (steps a-j of FIG. 9). After S1 Signaling Bearer Connection Establish, the next step will be to get ready for sending the Create Session Request to the S-GW. The process to achieve that is discussed in the next call flow.

First, it is determined if a SGW and PDN-GW were successfully selected (steps a-d of FIG. 8). In order to select P-GW and S-GW, the MME will perform DNS queries according to 3GPP TS 29.303 v8.2.0 "Domain Name System Procedures" specification. The first query will retrieve a list of candidate P-GWs based on the APN requested by the UE. The query will specify an Application Unique String based on the desired APN, where <APN-NI> is the APN specified by the UE and validated by the HLR. The DNS server responds with a list of candidate P-GWs that support the APN requested. The list will include a list of services supported by each P-GW and the list of corresponding IP addresses. Once the P-GW is identified, an S-GW serving the required tracking area identity (TAI) needs to be located preferably in the same location as the P-GW. The DNS server responds with a list of candidate S-GWs that support the Tracking Area requested. The list will include a list of services supported by each S-GW, the list of corresponding IP addresses, and the list of candidates with service and replacement names (type naming authority pointer (NAPTR) records).

Second, it is determined if connection establishment between MME and S-GW was successful. The MME attempts to create the session over the S11 interface (step e of FIG. 8).

Third, it is determined if connection establishment between S-GW and PDN-GW was successful (steps f-m of FIG. 8). The S-GW forwards the request to the P-GW by inserting the proper address parameters in the message (step f of FIG. 8). The P-GW responds with the information required to set-up the bearer transmission path (step m of FIG. 8). The S-GW gets ready to buffer received downstream packets and passes on the Create Session Response message (step n of FIG. 8).

Fourth, it is determined if connection establishment between eNodeB and S-GW was successful (FIG. 9). An S1AP Initial Context Set-up Request message (steps a and b of FIG. 9) to the eNodeB embeds the NAS signaling required to complete the set-up, as well as the IP address information for the S1-U tunnel. The radio bearer between the UE and the eNodeB is reconfigured based on the parameters received from the MME (steps c-d of FIG. 9). Then the eNodeB sends an S1AP Initial Context Set-up Response message (step e of FIG. 9) to the MME. Then the UE sends a "Direct Transfer" message to the eNodeB which includes an Attach complete signal, which is forwarded by the eNodeB to the MME (step f of FIG. 9). The UE can now start sending uplink packets (step g of FIG. 9). The MME sends a "Modify Bearer Request" message to the SGW (step h of FIG. 9). The SGW responds with a "Modify Bearer Response" message (step i of FIG. 9). The UE can now start receiving downlink packets and the active data session is established (step j of FIG. 9).

It should be noted that the ESRs in equations 3-8 may also be obtained by accounting for the number of successful establishment requests divided by the total number of establishment requests. Accordingly, the number would not need to be subtracted from 1 to obtain the final ESR.

In one embodiment, each one of the ESRs may be associated with a predefined threshold (e.g., 99 or 99.9) that represents an acceptable ESR for the LTE EPS network architecture 100. In one embodiment, the EPS ESR, the signaling radio bearer ESR, the S1 signaling bearer ESR and the PDN bearer ESR may all have the same predefined threshold. In another embodiment, the EPS ESR, the signaling radio bearer ESR, the S1 signaling bearer ESR and the PDN bearer ESR may all have a different predefined threshold. In yet another embodiment, some of the ESRs may have the same predefined threshold and other ESRs may have different predefined thresholds. In yet another embodiment, a predefined threshold may be associated only with the overall EPS ESR and no predefined threshold may be associated with the signaling radio bearer ESR, the S1 signaling bearer ESR and the PDN bearer ESR.

In one embodiment, each one of the ESRs may be calculated on a rolling basis over a predefined period of time. For example, the ESRs may be calculated continually for every 5 minute period of time or calculated continually for every 1 hour period of time and so on. In other words, a total number of failed establishment requests and a total number of establishment requests in the PDN bearer portion of the EPS data bearer 204 may be collected over a 5 minute period of time and the PDN bearer ESR may be calculated for that 5 minute period. In another example, the EPS ESR may be calculated continually for every 1 hour period of time by collecting data and calculating each of the signaling radio bearer ESR, the S1 signaling bearer ESR and the PDN bearer ESR within the same 1 hour period.

In addition, the signaling radio bearer 212 portion, the S1 signaling bearer 214 portion and the PDN bearer portion may all be associated with one or more independent root-cause analysis and trouble management tables. The root cause analysis and trouble management tables may include unique trouble codes, reason codes and action codes. For example, if the signaling radio bearer ESR was found to fall below a predefined threshold, root cause analysis and trouble management could be performed on the signaling radio bearer 212 portion of the EPS data bearer 204. Example root cause analysis and trouble management tables for the various portions are provided below in Tables 2-4:

TABLE 2

EXAMPLE SIGNALING RADIO BEARER ROOT CAUSE ANALYSIS AND TROUBLE MANAGEMENT TABLE

| TROUBLE CODE | REASON CODE | ACTION CODE |
| --- | --- | --- |
| RRC001 | Control Processing Overload | Check the eNodeB status |
| RRC002 | Admission Reject | Check the configuration in the eNodeB and MME |
| RRC003 | Max number of Active UE license exceeded | Check the eNodeB node capacity |
| RRC004 | Time out on RRC connection setup procedure | Check the eNodeB status |
| RRC005 | Protocol error | Use a protocol analyzer to look for protocol errors in the message sent by the UE |
| RRC006 | Unspecified Failure | TBA |

TABLE 3

EXAMPLE S1 SIGNALING BEARER ROOT CAUSE ANALYSIS AND TROUBLE MANAGEMENT TABLE

| TROUBLE CODE | REASON CODE | ACTION CODE |
| --- | --- | --- |
| S1S001 | EPS services not allowed | Check the configuration in the HSS |
| S1S002 | Network failure | Check the S6a interface |
| S1S003 | Congestion | Check the MME node capacity |
| S1S004 | Authentication failure | Check the configuration in the HSS |
| S1S005 | MME software failure | Perform restart |
| S1S006 | Requested QoS parameters not supported | Troubleshoot the DNS query sequence |
| S1S007 | Time out on Security Mode Command | Check the S6a interfaces |
| S1S008 | Protocol error | Use a protocol analyzer to look for protocol errors in the message sent by the UE |

TABLE 4

EXAMPLE PDN BEARER ROOT CAUSE ANALYSIS AND TROUBLE MANAGEMENT TABLE

| TROUBLE CODE | REASON CODE | ACTION CODE |
| --- | --- | --- |
| PDN001 | Insufficient resources | Check the SGW status |
| PDN002 | Request rejected by SGW or PGW | Check the SGW and PGW |
| PDN003 | Requested service option not subscribed | Check the configuration in the HSS |
| PDN004 | Network failure | Check the S11/S5/S8 interfaces |

TABLE 4-continued

EXAMPLE PDN BEARER ROOT CAUSE ANALYSIS AND TROUBLE MANAGEMENT TABLE

| TROUBLE CODE | REASON CODE | ACTION CODE |
| --- | --- | --- |
| PDN005 | IPv4 only allowed | Check the subscription in the HSS or the PGW configuration |
| PDN006 | Activation rejected, unspecified | Troubleshoot the attach sequence |
| PDN007 | Protocol error | Use a protocol analyzer to look for protocol errors in the message sent by the UE |
| PDN008 | Missing or Unknown APN | See the session event logs for information about this cause code |

Tables 2-4 are provided only as illustrative examples. The root cause analysis and trouble management tables may contain more or less entries or additional columns as needed to provide additional information.

The various ESR equations or functions, the predefined thresholds and the respective root cause analysis and trouble management tables may be stored in the rule management system 150. Similarly, the various calculations and determinations as discussed above are also performed by the rule management system 150.

Figure 3:
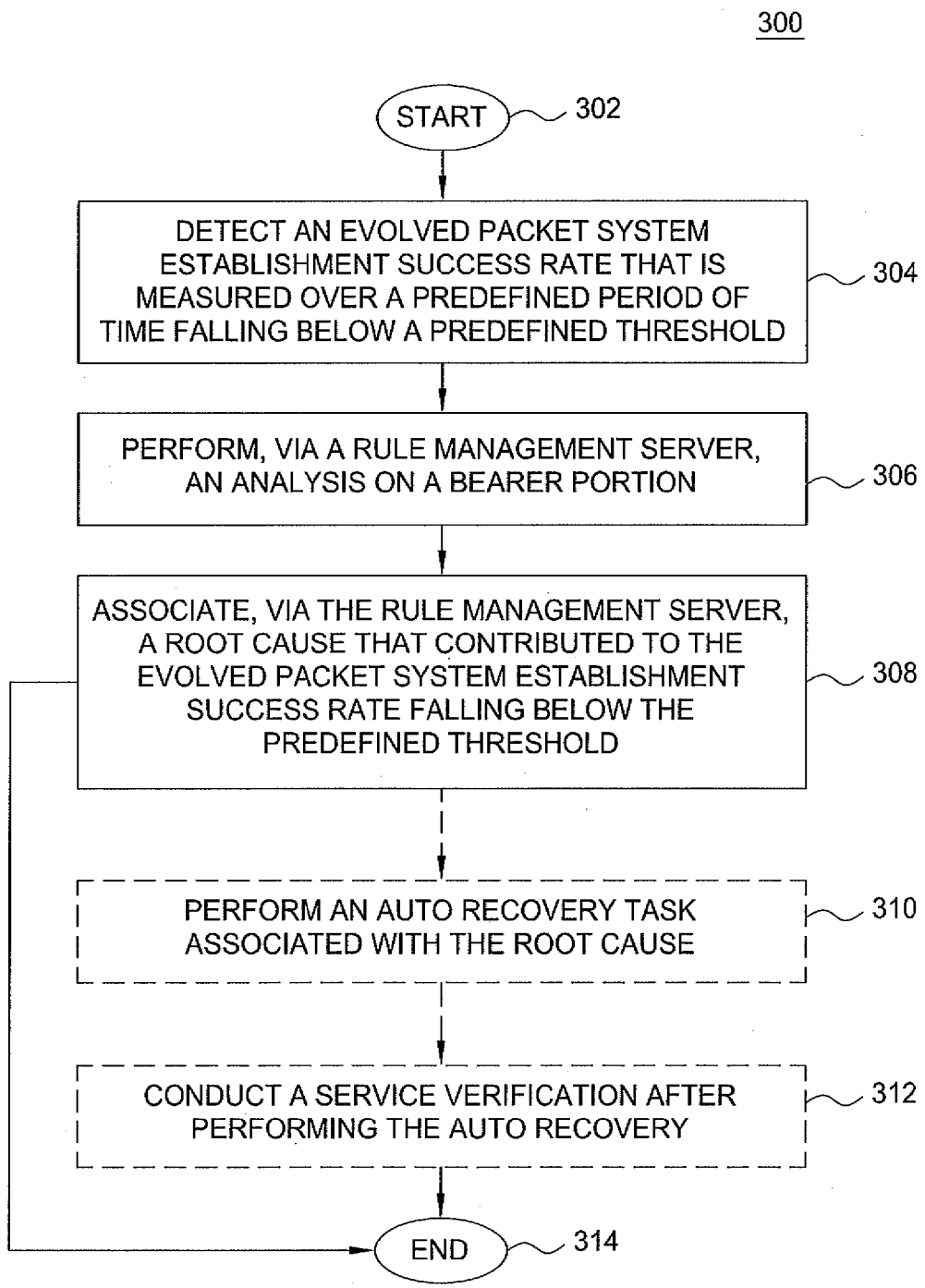
FIG. 3 illustrates a flowchart of a method for performing establishment management in a long term evolution evolved packet system network architecture.

FIG. 3 illustrates a high level flowchart of a method 300 for performing session establishment management in an LTE EPS network architecture 100 described above. In one embodiment, the method 300 may be implemented by the rule management system 150 or a general purpose computer having a processor, a memory and input/output devices as discussed below with reference to FIG. 5.

The method 300 begins at step 302. At step 304, the method 300 detects an evolved packet system establishment success rate that is measured over a predefined period of time falling below a predefined threshold. For example, the triggering event may be the detection of the EPS ESR falling below a predefined threshold (e.g., 99.9) for a predetermined time period (e.g., over a 5 minute time span).

At step 306, the method 300 performs, via a rule management server, an analysis on a bearer portion in response to the detection of the EPS ESR falling below the predefined threshold. In one embodiment, the bearer portion may be any portion of the signaling bearer that includes the signaling radio bearer 212 and the S1 signaling bearer 214 or the data EPS data bearer 204. For example, if the EPS ESR falls below a predefined threshold, the analysis may include attempting to identify or isolate a particular bearer portion that has an ESR that falls below a predefined threshold or simply has the lowest ESR relative to the other ESRs. For example if the signaling radio bearer ESR was 99.9, the S1 signaling bearer ESR was 99.9 and the PDN bearer ESR was 85.7, then the PDN bearer ESR would be the lowest ESR and be an isolated bearer portion.

In addition, trouble management may be performed on the isolated bearer portion. For example, specific equipment or interfaces may need to be checked for the isolated bearer portion. If the PDN bearer is the isolated bearer portion, the SGW and the PGW could be checked or the S11, S5/S8, S7, S1-U interfaces could be checked. For example, TABLES 2-4 may be used to determine what trouble management to perform.

At step 308, the method 300 associates, via the rule management server, a root cause that contributed to the EPS ESR falling below the predefined threshold. For example, the root cause may be attributed to a piece of equipment or an interface identified from performing the trouble management. For example, during the trouble management, the root cause may be due to a configuration error on the SGW. For example, the PDN bearer may have fallen below a predefined threshold or be the lowest ESR due to insufficient resources, as seen from TABLE 4. However, performing the trouble management may find that there is a problem with the SGW. Performing root cause analysis may identify that the SGW has a wrong configuration. As a result, the root cause for the PDN bearer falling below a predefined threshold or being the lowest ESR is determined to be a mis-configuration of the SGW.

At step 308, the method 300 may either proceed to optional steps 310 and 312 or end at step 314. If the method 300 proceeds to the optional steps, the method 300 proceeds to optional step 310. At the optional step 310, the method 300 performs an auto recovery task associated with the root cause. For example, a recovery task listed in the action code of the root cause analysis and trouble manage table may be executed. For example, if the root cause of the PDN bearer falling below a predefined threshold or being the lowest ESR is determined to be a mis-configured SGW leading to insufficient resources, as shown in TABLE 4, then the auto recovery task would be to check the SGW status or it may be to re-configure the SGW. In one embodiment, the recovery task may involve checking or changing a parameter or configuration of a piece of equipment, resetting a piece of equipment or pinging a piece of equipment.

At optional step 312, the method 300 conducts a service verification after performing the auto recovery. For example, the method 300 may perform a call trace to ensure that the establishment requests are properly executed to ensure that the executed recovery task resolved the root cause problem. The method ends at step 314.

Figure 4:
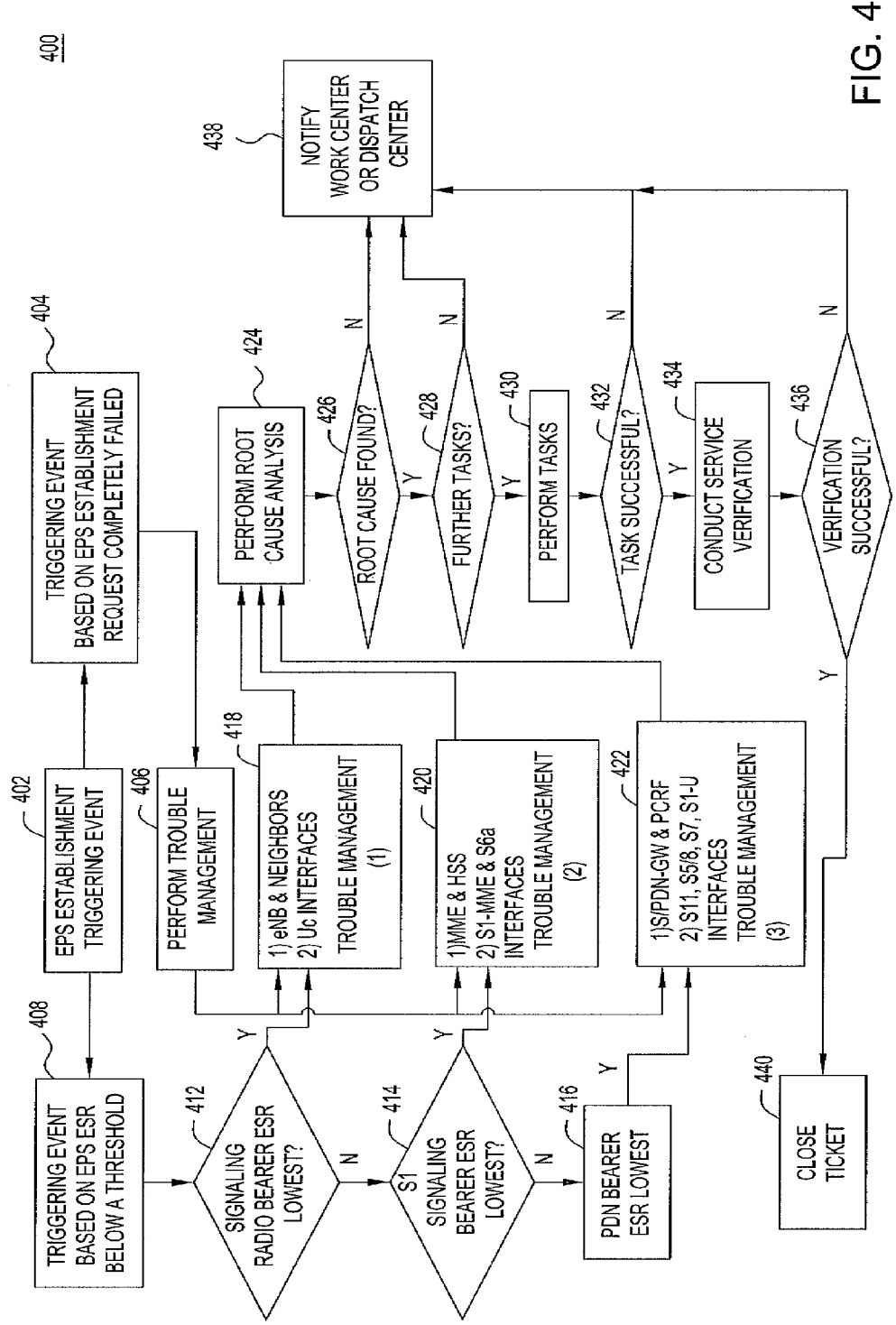
FIG. 4 illustrates a more detailed flowchart of a method for performing establishment management in a long term evolution evolved packet system network architecture.

FIG. 4 illustrates a detailed flowchart of a method 400 for performing establishment management in a long term evolution evolved packet system network architecture as described above. In one embodiment, the method 400 may be implemented by the rule management system 150 or a general purpose computer having a processor, a memory and input/output devices as discussed below with reference to FIG. 5.

The method 400 begins at step 402 when an EPS establishment triggering event is detected. For example a ticket may be received indicating that a single EPS establishment request has completely failed or that the EPS ESR has fallen below a predefined threshold. If the EPS establishment triggering event is based on a single EPS establishment request that completely failed, the method 400 proceeds to step 404. However, if the EPS establishment triggering event is based on the EPS ESR falling below a predefined threshold, the method 400 proceeds to step 408.

Referring back to step 404, the method 400 proceeds to step 406, where the method 400 performs trouble management. At step 406, the method is required to look at each portion of the EPS data bearer 204. As a result, from step 406, the method 400 simultaneously proceeds to steps 418, 420 and 422 to perform trouble management for each portion of the EPS data bearer 204. Once, the particular portion of the EPS data bearer 204 is identified as being a source of the problem, the method 400 proceeds to step 424 to perform root cause analysis.

Referring back to step 408, the method 400 proceeds to steps 412, 414 and 416 to isolate the failure. For example, the method 400 sequentially performs steps 412, 414 and 416. Steps 412, 414 and 416 are performed sequentially because if at step 412 it is determined that the signaling radio bearer ESR is the portion that has the lowest ESR, then there is no need to perform the subsequent steps 414 and 416. As a result, steps 414 and 416 need only be performed if the answer to step 412 is no, step 416 only needs to be performed if the answer to steps 412 and 414 are no.

At step 412, the method 400 determines if a signaling radio bearer ESR is the lowest ESR of the various ESR components of the EPS ESR as described above. If the answer to step 412 is yes, the method 400 proceeds to step 418 where trouble management specific to the signaling radio bearer 212 is performed. For example, the trouble management for the signaling radio bearer 212 may include checking equipment such as the eNodeB and its eNodeB neighbors and checking interfaces such as the Uc interface. For example, a root cause analysis and trouble management table specific for the signaling radio bearer 212 may be used similar to TABLE 2 described above. If the answer to step 412 is no, the method 400 proceeds to step 414.

At step 414, the method 400 determines if an S1 signaling bearer ESR is the lowest ESR of the various ESR components of the EPS ESR. If the answer to step 414 is yes, the method 400 proceeds to step 420 where trouble management specific to the S1 signaling bearer 214 is performed. For example, the trouble management for the S1 signaling bearer 214 may include checking equipment such as the MME and HSS and checking interfaces such as the S1-MME and S6a interfaces. For example, a root cause analysis and trouble management table specific for the S1 signaling bearer 214 may be used similar to TABLE 3 described above. If the answer to step 414 is no, the method 400 proceeds to step 416.

At step 416, the method 400 may simply assume that the PDN bearer ESR is the lowest ESR of the various components of the EPS ESR because if the EPS ESR fell below a predefined threshold and both the signaling radio bearer ESR and the S1 signaling bearer ESR are not the lowest ESR, then it can be assumed that the PDN bearer ESR must be the lowest. Alternatively, at step 416, the PDN bearer ESR may be calculated to confirm that the PDN bearer ESR is in fact the lowest ESR of the various ESR components of the EPS ESR.

From step 416, the method 400 proceeds to step 422 where trouble management specific to the PDN bearer is performed. For example, the trouble management for the PDN bearer may include checking equipment such as the SGW, the PGW and the PCRF and checking interfaces such as the S11, S5/S8, S7 and S1-U interfaces. For example, a root cause analysis and trouble management table specific for the PDN bearer may be used similar to TABLE 4 described above.

From either step 418, 420 or 422, the method 400 proceeds to step 424 where a root cause analysis is performed. The root cause analysis is performed to determine whether the problem is a equipment failure, a software failure, a configuration error or an interface error. For example, during step 420, the trouble management may identify that the MME has a problem. The root cause analysis may determine whether there is an MME equipment problem, an MME software failure, an MME configuration error or an MME interface error. The equipment failure may include when equipment fails, e.g., the MME is not functioning, the MME is not powered up, etc. The software failure may include when a compatibility mismatch is detected, e.g., the UE 104 is operating on an outdated software version. Thus, the UE 104 would require a software upgrade. The configuration error may include when a piece of hardware is not properly configured, e.g., a parameter may be incorrectly set with a wrong value. The interface error may include when one of the interfaces, e.g., the S5/S8 interface is not functioning properly or is down.

The method 400 proceeds to step 426 where the method 400 determines whether a root cause was found. If the answer at step 426 is no, the method 400 proceeds to step 438 where a work center or a dispatch center is notified and the method 400 ends. The method 400 may send a trouble code, e.g., a trouble code deduced from the root cause analysis and trouble management table, even if a root cause is not known as shown by RRC006 in TABLE 2.

If the answer to step 426 is yes, the method proceeds to step 428, where the method 400 determines whether further recovery tasks need to be performed. For example, the recovery tasks may include performing an auto recovery procedure. In one embodiment, the auto recovery procedure may be provided by the action codes listed in the root cause analysis and trouble management table associated with a particular trouble code. If the answer to step 428 is no, the method 400 proceeds to step 438 where the work center or the dispatch center is notified and the method 400 ends. The method 400 may send the trouble code and the reason code to the work center and the dispatch center.

If the answer to step 428 is yes, the method 400 proceeds to step 430 where the recovery task is performed. The method 400 then proceeds to step 432 where the method 400 determines if the recovery task was completed successfully. For example, if the recovery task required a restart of the MME, step 432 may determine whether the MME was restarted successfully. It could be that the MME is unreachable remotely due to a line failure and thus, the MME could not be restarted or that the restart failed to wake up a sleeping MME. If the answer to step 432 is no, the method 400 proceeds to step 438 where the work center or the dispatch center is notified and the method 400 ends. The method 400 may send the trouble code and the reason code to the work center and the dispatch center.

If the answer to step 432 is yes, the method 400 proceeds to step 434 where the method 400 conducts a service verification. For example, the method 400 may verify that the recovery task successfully corrected the problem, that the establishment request no longer fails and/or that the user is able to communicate properly over the LTE EPS network architecture 100.

The method 400 then proceeds to step 436, where the method 400 determines if the verification was successful. If the answer to step 436 is no, the method 400 proceeds to step 438 where the work center or the dispatch center is notified and the method 400 ends. The method 400 may send the trouble code, the reason code and action code to the work center and the dispatch center. If the answer to step 436 is yes, the method 400 may proceed to step 440 where the ticket is closed and the method 400 ends.

It should be noted that although not explicitly specified, one or more steps of the methods 300 and 400 described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 3 and 4 that recite a determining operation, or involve a decision, do not necessarily require that both branches of the determining operation be practiced. In other words, one of the branches of the determining operation can be deemed as an optional step.

Figure 5:
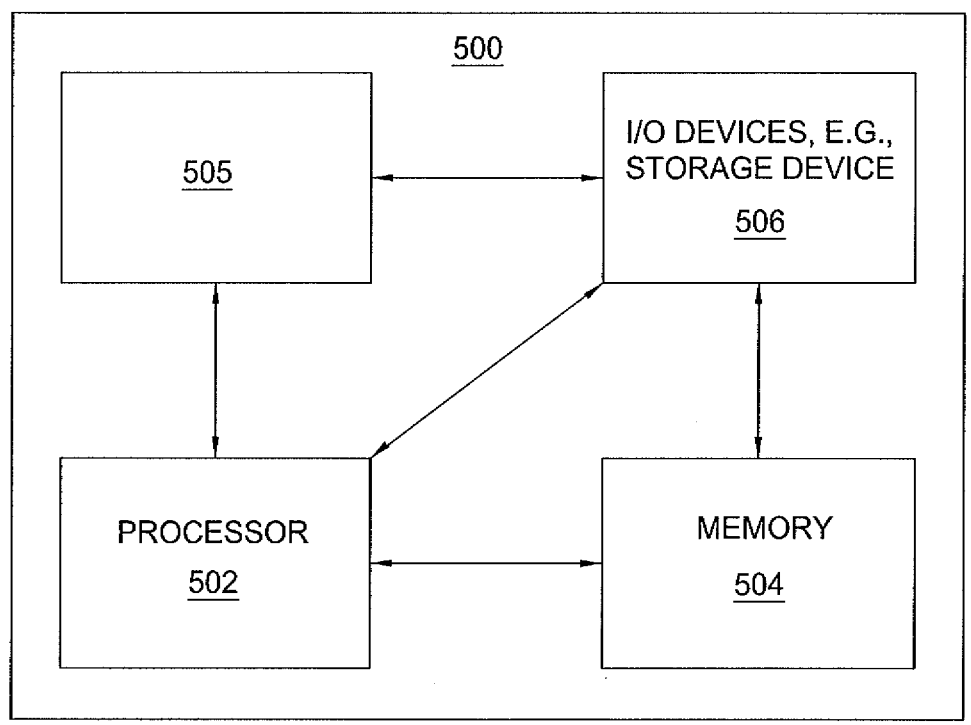
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for performing establishment session management, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for performing establishment session management can be loaded into memory 504 and executed by processor 502 to implement the functions as discussed above. As such, the present method 505 for performing establishment session management (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing session establishment management, comprising:
    detecting, via a processor, an evolved packet system establishment success rate that is measured over a period of time falling below a threshold;
    performing, via the processor, an analysis on a bearer portion in response to the detecting, wherein the performing the analysis comprises:
        isolating a cause of the evolved packet system establishment success rate falling below the threshold to one of: a portion of a signaling bearer or a portion of a packet data network bearer, wherein the signaling bearer comprises a signaling radio bearer and an S1 signaling bearer and the packet data network bearer comprises an S1 data bearer and an S5/S8 data bearer, wherein the isolating comprises:
            calculating an establishment success rate for the signaling radio bearer, the S1 signaling bearer and the packet data network bearer; and
            determining which of the establishment success rate for the signaling radio bearer, the S1 signaling bearer or the packet data network bearer has a lowest establishment success rate; and
        performing a trouble management on an isolated portion from the isolating that is responsible for causing the evolved packet system establishment success rate to fall below the threshold; and
    associating, via the processor, a root cause that contributed to the evolved packet system establishment success rate falling below the threshold.

2. The method of claim 1, further comprising:
    performing an auto recovery task associated with the root cause; and
    conducting a service verification after performing the auto recovery task.

3. The method of claim 1, wherein the performing the trouble management comprises:
  checking equipment associated with where an evolved packet system establishment triggering event is isolated to; and
  checking an interface with where the evolved packet system establishment triggering event is isolated to.

4. The method of claim 2, wherein the auto recovery task is based upon a root cause analysis table.

5. A non-transitory computer-readable medium storing a plurality of instructions which, when executed by a processor, cause the processor to perform operations for performing session establishment management, the operations comprising:
  detecting an evolved packet system establishment success rate that is measured over a period of time falling below a threshold;
  performing an analysis on a bearer portion in response to the detecting, wherein the performing the analysis comprises:
    isolating a cause of the evolved packet system establishment success rate falling below the threshold to one of: a portion of a signaling bearer or a portion of a packet data network bearer, wherein the signaling bearer comprises a signaling radio bearer and an S1 signaling bearer and the packet data network bearer comprises an S1 data bearer and an S5/S8 data bearer, wherein the isolating comprises:
      calculating an establishment success rate for the signaling radio bearer, the S1 signaling bearer and the packet data network bearer; and
      determining which of the establishment success rate for the signaling radio bearer, the S1 signaling bearer or the packet data network bearer has a lowest establishment success rate; and
    performing a trouble management on an isolated portion from the isolating that is responsible for causing the evolved packet system establishment success rate to fall below the threshold; and
  associating a root cause that contributed to the evolved packet system establishment success rate falling below the threshold.

6. The non-transitory computer-readable medium of claim 5, further comprising:
  performing an auto recovery task associated with the root cause; and
  conducting a service verification after performing the auto recovery task.

7. The non-transitory computer-readable medium of claim 5, wherein the performing the trouble management comprises:
  checking equipment associated with where an evolved packet system establishment triggering event is isolated to; and
  checking an interface with where the evolved packet system establishment triggering event is isolated to.

8. The non-transitory computer-readable medium of claim 6, wherein the auto recovery task is based upon a root cause analysis table.

9. An apparatus for performing session establishment management, comprising:
  a processor; and
  a computer-readable medium storing a plurality of instructions which, when executed by the processor, cause the processor to perform operations, the operations comprising:
    detecting an evolved packet system establishment success rate that is measured over a period of time falling below a threshold;
    performing an analysis on a bearer portion in response to the detecting, wherein the performing the analysis comprises:
      isolating a cause of the evolved packet system establishment success rate falling below the threshold to one of: a portion of a signaling bearer or a portion of a packet data network bearer, wherein the signaling bearer comprises a signaling radio bearer and an S1 signaling bearer and the packet data network bearer comprises an S1 data bearer and an S5/S8 data bearer, wherein the isolating comprises:
        calculating an establishment success rate for the signaling radio bearer, the S1 signaling bearer and the packet data network bearer; and
        determining which of the establishment success rate for the signaling radio bearer, the S1 signaling bearer or the packet data network bearer has a lowest establishment success rate; and
      performing a trouble management on an isolated portion from the isolating that is responsible for causing the evolved packet system establishment success rate to fall below the threshold; and
    associating a root cause that contributed to the evolved packet system establishment success rate falling below the threshold.

10. The apparatus of claim 9, further comprising:
  performing an auto recovery task associated with the root cause; and
  conducting a service verification after performing the auto recovery task.

11. The apparatus of claim 9, wherein the performing the trouble management comprises:
  checking equipment associated with where an evolved packet system establishment triggering event is isolated to; and
  checking an interface with where the evolved packet system establishment triggering event is isolated to.

* * * * *